UNITED STATES PATENT OFFICE.

EDGAR F. PRICE AND FRANK J. TONE, OF NIAGARA FALLS, NEW YORK.

ELECTRODE FOR ELECTRIC FURNACES AND PROCESS OF MAKING THE SAME.

No. 887,123.   Specification of Letters Patent.   Patented May 12, 1908.

Application filed January 8, 1906, Serial No. 295,093. Renewed December 26, 1907. Serial No. 408,150.

*To all whom it may concern:*

Be it known that we, EDGAR F. PRICE and FRANK J. TONE, citizens of the United States, residing at Niagara Falls, in the county of Niagara and State of New York, have invented certain new and useful Improvements in Electrodes for Electric Furnaces and Process of Making the Same, of which the following is a specification.

The electrodes usually employed in electric furnaces consist either of a mixture of amorphous carbon and a binder, or of graphitized carbon produced, for example, by the process of U. S. Patent Number 702,758, to E. G. Acheson.

Amorphous carbon electrodes are hard, brittle, non-homogeneous and of relatively low density and electrical conductivity. Graphitized electrodes are expensive and are of such high heat conductivity as to require water-cooled holders and cause serious heat losses; the conversion into graphite is also apt to be incomplete, in the case of large electrodes.

The present invention relates to the production of an electrode comprising a mixture of electrically-produced graphite and a binder, specifically one containing graphite and amorphous carbon in such proportions as to give the desired electrical and heat conductivity.

In manufacturing the new electrode, graphitized carbon produced by any usual electric furnace method is pulverized or ground and mixed with a suitable hydrocarbon capable of being converted into a permanent binder. The mixture is then molded and baked at a temperature sufficient to decompose the hydro-carbon and drive off the volatile constituents, leaving residual carbon which serves as a binder for the graphite. For certain purposes, it has been found desirable to employ electrodes having a lower heat conductivity than pure graphite electrodes possess, but having a higher electrical conductivity than is characteristic of ordinary amorphous carbon electrodes. In such cases it is advantageous to replace a portion of the graphite by ordinary amorphous carbon. The electrical and heat conductivities of the product are then a function of the ratio between the amounts of contained graphite and amorphous carbon and may therefore be fixed at any predetermined figure. The electrodes made by the herein described process are of uniform composition, throughout, are dense and strong, and can be easily machined. They can be produced at a much lower cost than electrodes which are electrically graphitized after being molded as the large percentage of breakage incident to the manufacture of the latter is obviated; and moreover the electric heat is more efficiently utilized. The low mechanical strength of electrodes which are electrically graphitized after being molded has been found to be a serious disadvantage in electric furnace practice, especially when employing electrodes of large size or extreme length. The use of electrodes made by the herein described process has been found to offer considerable advantage on account of their superior mechanical strength.

We claim:

1. An electrode for electric furnaces, comprising a mixture of electrically-produced graphite and a binder, as set forth.

2. An electrode for electric furnaces, consisting of a mixture of electrically-produced graphite, amorphous carbon and a binder, as set forth.

3. An electrode for electric furnaces, consisting of a coked mixture of electrically-produced graphite, amorphous carbon and a hydrocarbon binder, as set forth.

4. The process of making electrodes, which consists in shaping a mixture of electrically-produced graphite and a hydrocarbon binder into an electrode, and heating it to a temperature sufficient to coke the binder, as set forth.

5. The process of making electrodes, which consists in shaping a mixture of electrically-produced graphite and a hydrocarbon binder into an electrode, and heating it in a nonoxidizing atmosphere to a temperature sufficient to coke the binder, as set forth.

6. The process of making electrodes, which consists in shaping a mixture of electrically-produced graphite and a hydrocarbon binder into an electrode, and electrically heating it to a temperature sufficient to coke the binder, as set forth.

7. The process of making electrodes, which consists in shaping a mixture of electrically-produced graphite and a hydrocarbon binder into an electrode, and electrically heating it in a nonoxidizing atmosphere to a temperature sufficient to coke the binder, as set forth.

8. The process of making electrodes, which consists in shaping a mixture of electrically-produced graphite, amorphous carbon and a hydrocarbon binder into an electrode, and heating it to a temperature sufficient to coke the binder, as set forth.

9. The process of making electrodes, which consists in shaping a mixture of electrically-produced graphite, amorphous carbon and a hydrocarbon binder into an electrode, and heating it in a nonoxidizing atmosphere to a temperature sufficient to coke the binder, as set forth.

10. The process of making electrodes, which consists in shaping a mixture of electrically-produced graphite, amorphous carbon and a hydrocarbon binder into an electrode, and electrically heating it to a temperature sufficient to coke the binder, as set forth 11. The process of making electrodes, which consists in shaping a mixture of electrically-produced graphite, amorphous carbon and a hydrocarbon binder into an electrode, and electrically heating it in a nonoxidizing atmosphere to a temperature sufficient to coke the binder, as set forth.

In testimony whereof, we affix our signatures in presence of two witnesses.

EDGAR F. PRICE.
FRANK J. TONE.

Witnesses as to the signature of Edgar F. Price:
 J. S. JACKSON,
 F. B. O'CONNOR.

Witnesses as to the signature of Frank J Tone:
 ASHMEAD G. RODGERS,
 FRANK L. BUELL.